United States Patent
Bolton et al.

(10) Patent No.: US 10,555,121 B2
(45) Date of Patent: *Feb. 4, 2020

(54) ADAPTIVE LOCATION BRANDING

(71) Applicant: CollegeNET, Inc., Portland, OR (US)

(72) Inventors: Jeff Michael Bolton, Portland, OR (US); James H. Wolfston, West Linn, OR (US)

(73) Assignee: CollegeNet, Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/876,297

(22) Filed: Jan. 22, 2018

(65) Prior Publication Data

US 2018/0227710 A1    Aug. 9, 2018

Related U.S. Application Data

(63) Continuation of application No. 14/949,477, filed on Nov. 23, 2015, now Pat. No. 9,883,344.

(51) Int. Cl.
*H04W 4/02* (2018.01)
*H04W 4/80* (2018.01)
*H04L 29/08* (2006.01)

(52) U.S. Cl.
CPC ............ *H04W 4/025* (2013.01); *H04L 67/02* (2013.01); *H04W 4/80* (2018.02)

(58) Field of Classification Search
None
See application file for complete search history.

(56) References Cited

U.S. PATENT DOCUMENTS

| | | |
|---|---|---|
| 7,441,203 B2 | 10/2008 | Othmer et al. |
| 7,450,954 B2 | 11/2008 | Randall |
| 7,873,708 B2 | 1/2011 | Durand et al. |
| 8,073,467 B2 | 12/2011 | Gupta et al. |
| 8,099,109 B2 | 1/2012 | Altman et al. |
| 8,214,738 B2 | 7/2012 | Othmer et al. |
| 8,351,923 B2 | 1/2013 | Griff et al. |
| 8,396,485 B2 | 3/2013 | Grainger et al. |
| 8,412,166 B2 | 4/2013 | Ellanti et al. |

(Continued)

FOREIGN PATENT DOCUMENTS

| | | |
|---|---|---|
| CA | 2635785 A1 | 7/2007 |
| GB | 2425921 A | 7/2009 |

(Continued)

*Primary Examiner* — San Htun
(74) *Attorney, Agent, or Firm* — Scheinberg & Associates, PC; John B. Kelly; Michael O. Scheinberg

(57) ABSTRACT

A method and system for providing location-specific information to users, wherein this information is directly maintained and supplied by the provider of the service. This information is supplied by means of an application running on a personal communication device, where the application is developed and provided by a third-party servicer (e.g., CollegeNET) and the third party servicer makes various program options/APIs of the application available to and selectable by its customers (e.g., various universities). This way, the organization wanting to supply the information, such as a university, does not have to develop their own unique applications to provide a unique user experience tied to the university, and the users don't have to download an application for each school they visit.

19 Claims, 4 Drawing Sheets

(56) References Cited

U.S. PATENT DOCUMENTS

| | | |
|---|---|---|
| 8,463,247 B2 | 6/2013 | Misiag |
| 8,497,796 B2 | 7/2013 | Shamilian et al. |
| 8,666,436 B2 | 3/2014 | Ellanti et al. |
| 8,668,592 B2 | 3/2014 | Watkins, Jr. et al. |
| 8,682,350 B2 | 3/2014 | Altman et al. |
| 8,738,024 B1 | 5/2014 | Kerr et al. |
| 2004/0203768 A1 | 10/2004 | Ylitalo et al. |
| 2004/0203863 A1 | 10/2004 | Huomo |
| 2004/0204063 A1 | 10/2004 | Van Erlach |
| 2006/0179127 A1 | 8/2006 | Randall |
| 2006/0236257 A1 | 10/2006 | Othmer et al. |
| 2007/0001904 A1* | 1/2007 | Mendelson .......... G01C 21/206 342/450 |
| 2007/0155489 A1 | 7/2007 | Beckley et al. |
| 2009/0005080 A1* | 1/2009 | Forstall ................ H04W 4/02 455/456.3 |
| 2009/0170532 A1 | 7/2009 | Lee et al. |
| 2010/0109864 A1 | 5/2010 | Haartsen et al. |
| 2010/0188279 A1 | 7/2010 | Shamilian et al. |
| 2010/0241507 A1 | 9/2010 | Quinn et al. |
| 2010/0317371 A1* | 12/2010 | Westerinen ....... H04M 1/72566 455/456.6 |
| 2010/0331016 A1 | 12/2010 | Dutton et al. |
| 2011/0065451 A1 | 3/2011 | Danado et al. |
| 2011/0070872 A1 | 3/2011 | Ellanti et al. |
| 2011/0082808 A1* | 4/2011 | Beykpour ............. G06Q 10/06 705/327 |
| 2011/0105150 A1* | 5/2011 | Moon .................... H04W 4/02 455/456.3 |
| 2011/0137881 A1* | 6/2011 | Cheng ................ H04W 4/021 707/706 |
| 2011/0165859 A1* | 7/2011 | Wengrovitz ........ H04M 1/7253 455/411 |
| 2011/0191432 A1 | 8/2011 | Layson, Jr. |
| 2011/0279311 A1 | 11/2011 | Hamano |
| 2011/0300837 A1 | 12/2011 | Misiag |
| 2012/0213205 A1 | 8/2012 | Tammisetti |
| 2012/0215617 A1 | 8/2012 | Shah et al. |
| 2012/0220314 A1 | 8/2012 | Altman et al. |
| 2013/0080578 A1 | 3/2013 | Murad et al. |
| 2013/0109412 A1 | 5/2013 | Nguyen et al. |
| 2013/0183924 A1 | 7/2013 | Saigh et al. |
| 2014/0032437 A1 | 1/2014 | Greenberg |
| 2014/0065965 A1 | 3/2014 | Prasad et al. |
| 2014/0207575 A1* | 7/2014 | Freed-Finnegan ........................... G06Q 30/0641 705/14.58 |
| 2015/0189070 A1* | 7/2015 | Baker ............... H04M 1/72572 715/738 |
| 2015/0296347 A1 | 10/2015 | Roth |

FOREIGN PATENT DOCUMENTS

| | | |
|---|---|---|
| WO | 2004008792 A1 | 1/2004 |
| WO | 2010144651 A2 | 12/2010 |
| WO | 2011037769 A1 | 3/2011 |

* cited by examiner

ADAPTIVE LOCATION BRANDING

This application is a continuation of U.S. application Ser. No. 14/949,477, filed Nov. 23, 2015, which is hereby incorporated by reference.

TECHNICAL FIELD OF THE INVENTION

The present invention relates to portable communications devices, and in particular to wireless portable communication devices (e.g., "Smartphones", etc.) running applications having graphic displays.

BACKGROUND OF THE INVENTION

The use of GPS systems for navigation is accepted and commonly used, now almost indispensable, especially for a person navigating unfamiliar places such as a new city, a college campus, etc. More recently, additional functions such as applications ("apps") which will tell the user where to find particular restaurants, or a gas station nearby, etc. have appeared. The information supplied as a result of these searches is not served from databases tended or populated by the suppliers of those services. Instead this third party information (e.g., gas prices, restaurant menu items, campus events) is controlled, compiled, and served from databases managed by a third-party search provider, such as Google.

It may be preferable, for both the service provider and the end-user, that this information be provided instead from databases tended by the service provider (i.e., the restaurant, theater, university, etc.) to ensure that this information is current, complete, and reliable. In addition, third-party searches do not change the appearance and features based on the detected location—i.e., a Google search result will not change the display on a portable communications device to show the Stanford colors and logo, and will not provide the detail of information which Stanford might want to provide a visitor to the Stanford campus.

Thus it would be desirable to configure a location-aware app on a portable communications device that changes its appearance and features based on a detected location.

It would be further desirable that the location can be detected by any known means such as GPS, Wi-Fi, mobile network, Bluetooth, NFC, geo-fencing with beacons, and the like.

SUMMARY OF THE INVENTION

Embodiments of the invention are directed to a location-aware application on a portable communication device that changes its appearance and features based on a detected location. The user may first install the application on his portable communications device and the application may then present a different appearance based on the detected location. The location can be detected by any known means such as, but not limited to, GPS, Wi-Fi, mobile network, Bluetooth, NFC, an iBeacon, geo-fencing with locational beacons, and the like. After the location is detected, location-specific information may go to users through the application displaying this information on the display screen of the portable communication device, wherein this information is from databases controlled by the provider of the local service.

Several exemplary applications of the application are presented, but many other applications are possible within the scope of the invention as will be clear from the descriptions of embodiments provided herein.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

Figure 1:
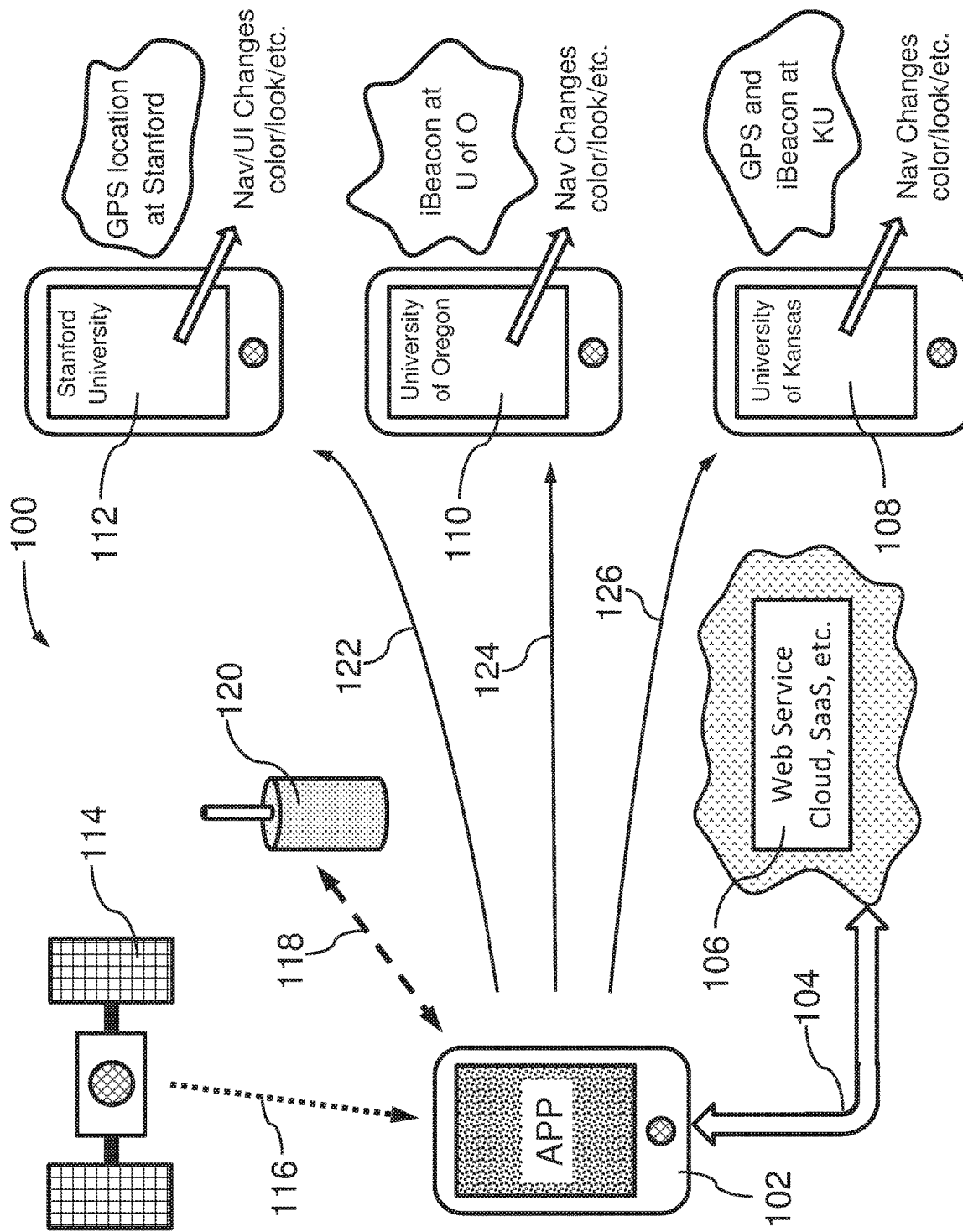
FIG. 1 shows a schematic diagram of the operation of a portable communications device comprising embodiments of the invention in several university environments.

Embodiments of the present invention provide for improved methods for providing location-specific information to users, wherein this information comes from databases tended by the provider of the service. In a preferred embodiment, the application is developed and provided by a third-party servicer (e.g., CollegeNET) and the third party servicer makes various program options/APIs of the application available to and selectable by its customers (e.g., various universities). This way, the various universities don't have to develop their own unique applications (and coax users into downloading them) to provide a unique user experience tied to the university, and the users don't have to download an application for each school they visit.

In the following description, the term "location-defining device" as used herein applies to any one or more of the following types of location-transmitting electronic devices: the global positioning system (GPS), local area wireless computer networks such as IEEE 802.11(Wi-Fi), mobile cellular network devices, Bluetooth devices, near-field communication (NFC) devices, an iBeacon® from Apple Computer, Inc., a radio-frequency identification (RFID) device, geo-fencing with locational beacons, etc. The term "brand" or "branding information" as used herein refers to any information capable of indicating source, origin, affiliation, or sponsorship of goods or services including, but not limited to, trademarks, service marks, logos, slogans, colors, mascots; banners, crests; seals, emblems, sounds, jingles, fight songs, anthems, and the like. The term "portable communication device" as used herein refers to any signal processing device, data processing system, or computer system adapted for communication of data at least by wireless means and adapted for portability by the user, including, but not limited to, cellular telephones, smartphones, tablet devices, laptop computers, personal digital assistants, and the like.

The following sections present illustrative examples of applications of embodiments of the invention, however other applications fall within the scope of the invention as may be understood by those skilled in the art.

In a first example of possible applications of embodiments of the invention, a user visits the Harvard campus as detected by proximity to a Harvard-encoded location-defining device, and the application's appearance (i.e., the screen display, or graphic user interface) changes to Harvard branding (school colors, symbols, mascot, mottos, trademarks, background images, etc.) and presents a first set of options to the user that Harvard wants to make available to the user. These options may be determined based on a status of the user (guest, faculty, staff, student, prospective student, parent, donor, etc.), wherein the status may be determined by sign-on credentials to the application. The user then subsequently may visit the Yale campus as detected by proximity to a Yale-encoded location-defining device, and the appearance of the same application changes to Yale branding and presents a second set of options to the user that Yale wants to make available to the user—note that the second set of options offered by Yale may differ from the first set of options offered by Harvard.

A second example of possible applications of embodiments of the invention could be a user visiting a convention hall with many exhibits. In response to being near a first vendor's exhibit (as may be detected by proximity to a first Ikea-encoded location-defining device), the application's appearance changes to the vendor's branding and presents options and/or promotional information to the user that the vendor wants to make available to the user. For example, at an Ikea exhibit, the application may change to blue and yellow colored accents with an Ikea logo in the corner. Upon approaching a second exhibit, such as a Coca Cola exhibit as detected by proximity to a second Coca-Cola-encoded location-defining device, the application may change to red and white colored accents with a Coca Cola logo in the corner. Functionality of the application can change based on the vendor's preferences (e.g., promotional videos, discount offers, online order forms, downloadable product brochures/specifications, etc.). These options may be determined based on a status of the user (employee, attendee, customer, preferred customer, etc.), wherein the status may be determined by sign-on credentials. The user then may approach a third vendor's exhibit as detected by proximity to a third location-defining device, and the appearance of the same application changes to that vendor's branding and presents options to the user that the new vendor wants to make available to the user. A similar use case could be applied to any exhibit hall or environment, such as museums, zoos, nature preserves, art exhibits, historical sites or exhibits, trade shows, etc.

In yet another exemplary application, embodiments of the invention may be used for the scheduling of meeting spaces. As an example, a user may be visiting a campus building with multiple classrooms. The application detects the user's proximity to the building by detecting a signal from a location-defining device and presents to the user schedules for the various classrooms in the building. At a more granular level, the application detects proximity to a particular classroom (e.g., by sensing a local location-defining device near the classroom entry point) and displays the schedule for that particular classroom. Scheduling options may be determined based on a status of the user (guest, faculty, staff, student), wherein the status may be determined by sign-on credentials. For example, faculty may have "write" privileges to schedule time in the classroom, whereas students may only have "read" privileges to see the scheduled classes/events. The same use-case can be applied to an office building with multiple conference/meeting rooms.

FIG. 1 shows a schematic diagram 100 of the operation of an application according to embodiments of the invention in a portable communications device 102 according to embodiments of the invention operating in several university environments, similar to the first application described briefly above. A locational signal from an exemplary location-defining device 120, such as GPS, Wi-Fi, mobile network, Bluetooth, NFC, an iBeacon, geo-fencing with locational beacons, etc. is detected 118 by the an application according to embodiments of the invention, running in portable communications device 102. Once the approximate location of the device 102 has been determined by location information provided by location-defining device 120, and/or locational information has been obtained 116 from the GPS system 114, the application interrogates the web service operating in the cloud in a software-as-a-service mode to obtain information to be provided and displayed for the user according to pre-determined choices by the controlling institution (i.e., the organization which provided and programmed the location data on the location-defining device).

In the example 112, if portable communications device 102 senses that it is on the Stanford University campus from the GPS signal, the application 122 will change various attributes of the display on the portable communications device 102, such as the color (to Stanford University color, cardinal red), logos, display options, etc. Similarly, if the portable communications device 102 detects a University of Oregon (U of O)-encoded location-defining device, the application 110 determines that it is on the U of O campus, and may change 124 various attributes of the display on the portable communications device 102, such as the colors (to U of O colors, green and yellow), logos, display options, etc. Finally, in a third case where both a University of Kansas (KU)-encoded location-defining device and the GPS signal both indicate that the portable communications device 102 is on the KU campus, the application may change 126 various attributes of the display on the portable communications device 102, such as the colors (to KU colors, crimson and blue), logos, display options, etc. As described in the first exemplary application above, the specific changes may depend on the pre-defined status of the user of the portable communications device, for example depending on whether they are a guest, faculty, staff, student, prospective student, parent, donor, etc.

Figure 2:
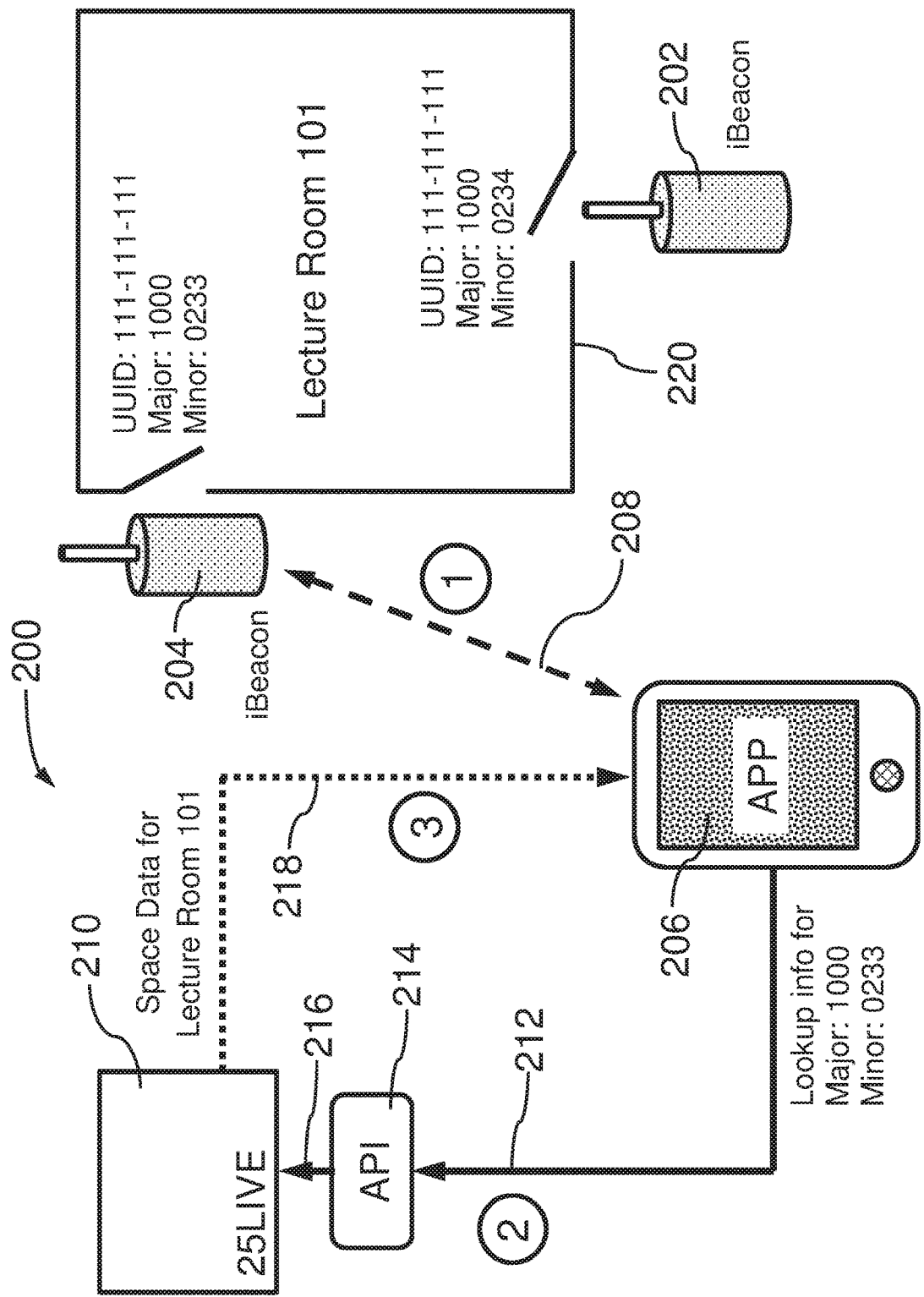
FIG. 2 shows a schematic diagram of the operation of a portable communications device comprising embodiments of the invention in a lecture room locating situation.

FIG. 2 shows a schematic diagram 200 of the operation of an application according to embodiments of the invention in a portable communications device 206 in a lecture room 220 locating situation, similar to the third application described briefly above. A locational signal from an exemplary location-defining device 204, such as an iBeacon as shown here, is detected 208 by the application according to embodiments of the invention, running in portable communications device 206. In this particular example, the locational information comprises a Major coordinate with the value "1000" (denoting the lecture room #101, 220) and a Minor coordinate with the value "0233" (denoting the particular door into lecture room #101—in cases where lecture room #101 may be subdivided by curtains or movable dividing walls, etc., the Minor coordinates for lecture room #101 could denote specific smaller meeting spaces within lecture room 101, each entered through a separate door as shown. Once the approximate location of the device 206 has been determined, the application interrogates 212 the 25Live 210 software-as-a-service (SaaS) through the API 214 linkage 216. The 25Live system then responds 218 by transmitting space data for lecture room 101 to device 206. This space data may include the current assignment of lecture room (as entered through door 0233, in cases where lecture room 101 has been subdivided into individual spaces each entered through separate doors). For example, if iBeacon 202 were interrogated, space data for lecture room #101 would also be provided by the 25Live system, but with possible differences relating to the (possible) room subdivision with separate allocations for the subdivided spaces. In cases where lecture room #131 is not subdivided, the space data provided for both Major: 1000/Minor: 0233 and for major: 1000/Minor: 0234 could be the same.

Figure 3:
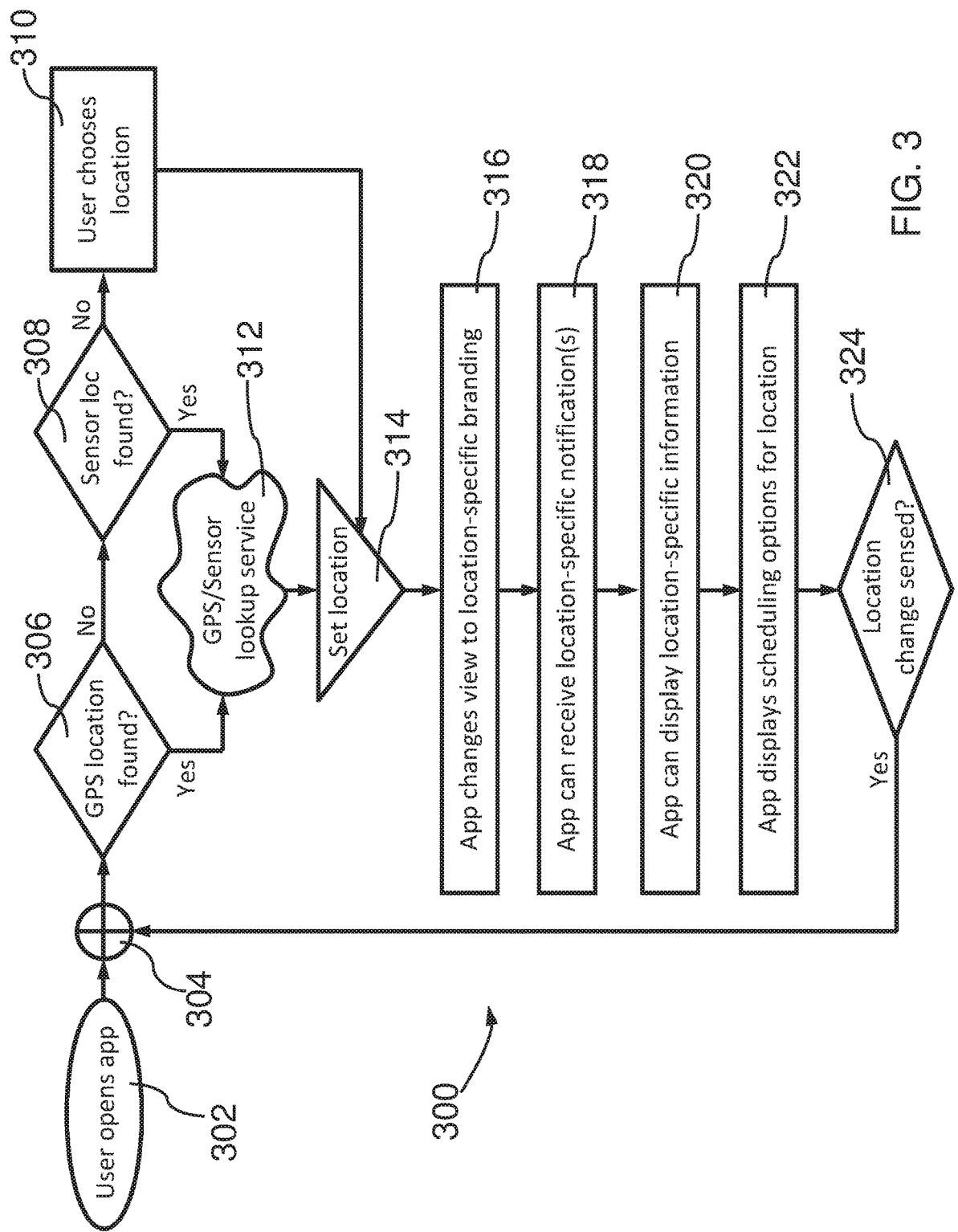
FIG. 3 shows a flowchart of the operation of a portable communications device comprising embodiments of the invention illustrating various possible functions.

FIG. 3 shows a flowchart 300 of the operation of an application according to embodiments of the invention. In block 302, the user first opens the application ("app") on their portable communications device, such as 102 in FIG. 1 or 206 in FIG. 2. The app first determines if a GPS location 306 can be found for the portable communications device— if yes, then there is no need to determine if a location-defining device ("sensor") is nearby, and thus the app immediately branches to an interrogation of the GPS/Sensor lookup service 312. The GPS/Sensor lookup service has pre-defined locational information for various sites applicable to the app, such as for example University campus coordinates (a multiplicity of perimeter coordinates for the campus which would typically cover a large area), or coordinates for individual buildings on campus, or locational information for individual location-defining devices on campus (since GPS may be unusable within internal building spaces), etc. If a GPS location cannot be found (typically due to interference with the reception of signals from multiple GPS satellites), then an effort is made to find a signal 308 from a local Sensor (location-defining device). If such a signal cannot also be found, then the user may choose a location 310, possibly from a pre-defined list of possible locations displayed on the portable communications device screen.

Thus the location may be set 314 for the application in one of three ways: 1) from a GPS signal, 2) from a local Sensor, or 3) directly (manually) by the user. Once the location has been set, blocks 316-322 perform various functions based on the set location from block 314. Block 316 may change the screen display ("view") to correspond to the set location— for example as in FIG. 1, to a Stanford University color scheme and logo. Next block 318 may display various location-specific notifications—for example, the time of the next Stanford home football game—this received information would then be displayed for the user in block 320. In the case of a classroom or exhibit hall location, block 322 might display the next few activities scheduled for that space and their times and availability (e.g., are all tickets sold out for the next Stanford theater production which starts 2 hours from now?).

Following execution of the location-triggered actions in blocks 316-322, block 324 senses if the location has changed (e.g., the user may be walking the halls of a classroom building, wherein block 308 is repetitively reading locational information from sensors at each classroom door). Once a change in location is sensed in block 324, combination block 304 triggers block 306 and possibly block 308 to look for new GPS coordinates and possibly a new Sensor location and the cycle repeats.

Figure 4:
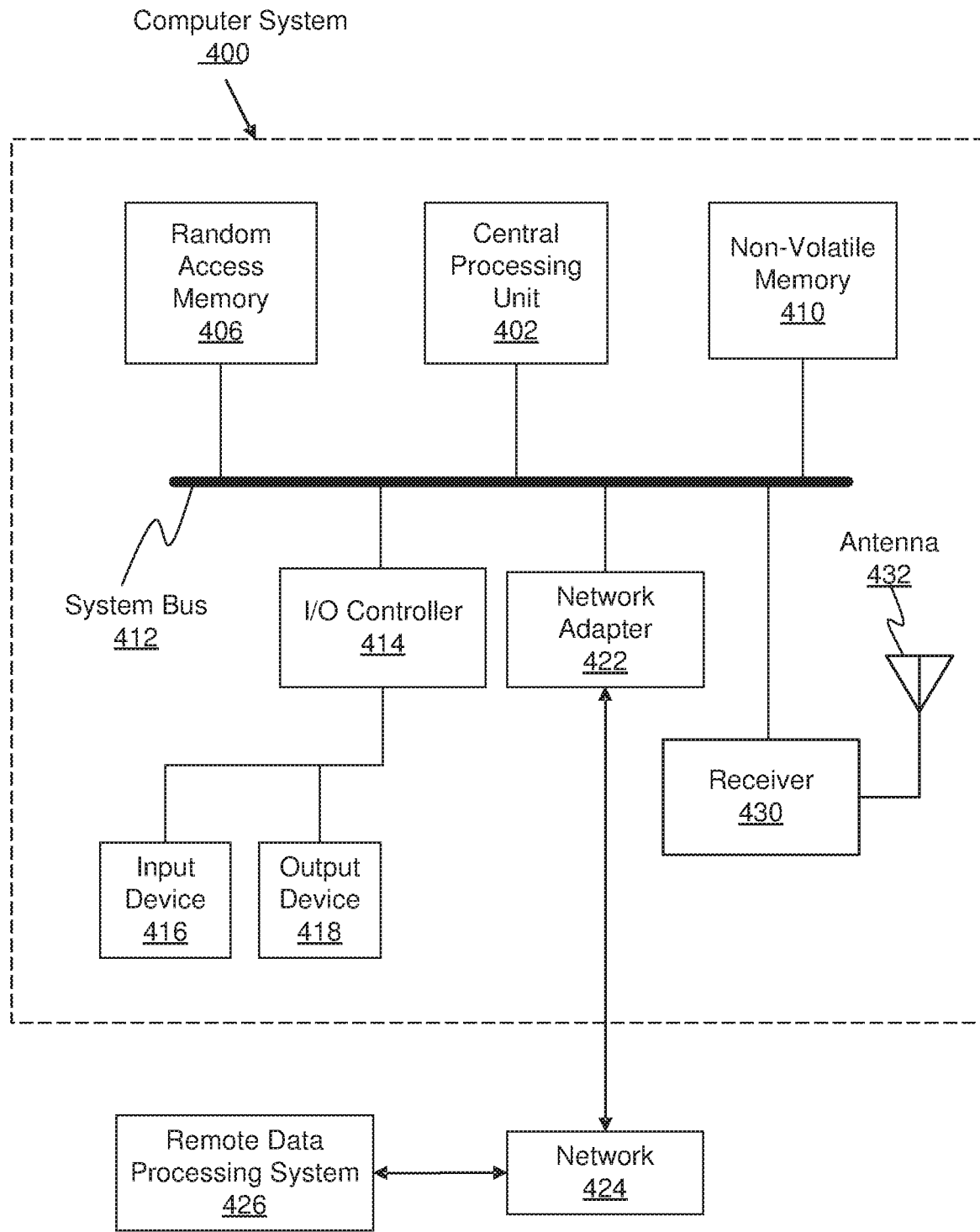
FIG. 4 shows a block diagram of portable communications device 400 suitable for storing and/or executing a computer program product in accordance with embodiments of the present invention.

At least one embodiment of the present invention is directed to a computer program product encoded in a non-transitory, computer-readable medium. The computer program product comprises computer-executable instructions that, when executed, causes one or more computer systems to perform embodiments of the present invention, such as, but not limited to, the method shown in FIG. 3. Turning now to FIG. 4, a block diagram is shown of portable communications device 400 suitable for storing and/or executing a computer program product in accordance with embodiments of the present invention. Portable communications device 400 is suitable for use as portable communication device 102 and 206. Portable communications device 400 includes a central processing unit 402 having at least one microprocessor. Central processing unit 402 can be coupled directly or indirectly to memory elements through system bus 412. The memory elements comprise non-transitory computer-readable media capable of storing computer-executable instructions. The memory elements can include random access memory 406 employed during the actual execution of the program code and non-volatile memory 410 for longer term storage of data and instructions. One or more input devices 416 and output devices 418 can be coupled to system bus 412 either directly or through an intervening I/O controller 414. Examples of input device 416 include, but are not limited to, a pointing device, such as a mouse or a trackpad, or a keyboard. Examples of output device 418 include, but are not limited to, a display screen or a printer. In a preferred embodiment, input device 416 and output device 418 are combined into a single device comprising a touchscreen comprising a display screen (for displaying information to the user of portable communications device 400) having a touch-sensitive surface (for receiving input from the user). Network adapters 422 may also be coupled to portable communications device 400 to enable the system to become coupled to remote computer system 426 or remote printers or storage devices through intervening private or public networks 424. Modems, cable modems, Ethernet cards, and wireless network adapters are just a few of the currently available types of network adapters. In a preferred embodiment, portable communications device 400 includes one or more receivers 430. Receiver 430 receives wireless signals via antenna 432. Receiver 430 is adapted for receiving a location signal from a location-defining device 120 or GPS system 114. Receiver 430 can comprise a transceiver capable of both transmitting and receiving wireless signals. While various component devices of portable communications device 400 are shown as separate devices in FIG. 4 for purposes of demonstration, various component devices may be integrated into a single device as is known in the art, such as in a system-on-a-chip (SoC) device.

Although the present invention and its advantages have been described in detail, it should be understood that various changes, substitutions and alterations can be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding

We claim as follows:

1. A method for changing the appearance and/or functionality of a location-aware application on a portable communication device based on a detected location, the method comprising the steps of:
   detecting a location of the portable communications device by receiving a location signal from a location-defining device, the location-defining device comprising at least one of: a multiplicity of GPS satellites, a Wi-Fi local network, a near-field communication (NFC) device, an iBeacon, geo-fencing with locational beacons, a Bluetooth device, a radio-frequency identification (RFID) device, and a mobile cellular network device;
   interrogating a web-based service for information pertaining to an organization located at the detected location;
   receiving the information from the web-based service pertaining to the organization located at the detected location; and
   modifying one or more graphical user interface elements of the location-aware application of the portable communication device using the information received from the web-based service such that a graphical user interface of the location-aware application displays an appearance showing affiliation with the organization at the detected location;
   wherein modifying the one or more graphical user interface elements of the location-aware application does not include modifying an icon used to launch the location-aware application or any other application; and
   wherein modifying one or more graphical user interface elements of the location-aware application includes changing characteristics of the screen display on the portable communication device so that the location-aware application shows location-specific branding information associated with the organization at the detected location, said location-specific branding information including one or more selections from a group consisting of: trademarks associated with the organization at the detected location, service marks associated with the organization at the detected location, logos associated with the organization at the detected location, slogans associated with the organization at the detected location, colors associated with the organization at the detected location, mascots associated with the organization at the detected location, banners associated with the organization at the detected location, crests associated with the organization at the detected location, seals associated with the organization at the detected location, and emblems associated with the organization at the detected location.

2. The method of claim 1, wherein the location-defining device comprises a multiplicity of GPS satellites.

3. The method of claim 2, wherein the first location-definition devices interrogated for the location of the portable communication device are the GPS satellites.

4. The method of claim 1, wherein the location-defining device comprises a Wi-Fi local network.

5. The method of claim 1, wherein the location-defining device comprises a near-field communication (NFC) device.

6. The method of claim 1, wherein the location-defining device comprises an iBeacon.

7. The method of claim 1, wherein the location-defining device comprises geo-fencing with locational beacons.

8. The method of claim 1, wherein the location-defining device comprises a Bluetooth device.

9. The method of claim 1, wherein the location-defining device comprises a radio-frequency identification (RFID) device.

10. The method of claim 1, wherein the location-defining device comprises a mobile cellular network device.

11. The method of claim 1, wherein the information to be provided to the user comprises location-specific notifications; and wherein the information displayed to the user comprises the location-specific notifications.

12. The method of claim 11, wherein the location-specific notifications comprise information about upcoming events scheduled for the detected location.

13. The method of claim 1, wherein the information to be provided to the user comprises scheduling options; and wherein the information displayed to the user comprises the scheduling options.

14. The method of claim 1, wherein if there is a change in the detected location from the location-defining device, then the steps of interrogating, receiving and displaying are repeated.

15. The method of claim 1, wherein after a pre-determined period of time has elapsed, then the steps of interrogating, receiving and displaying are repeated.

16. The method of claim 1, further comprising:
   detecting a second location of the portable communications device by receiving a location signal from a second location-defining device, the second location-defining device comprising at least one of: a multiplicity of GPS satellites, a Wi-Fi local network, a near-field communication (NFC) device, an iBeacon, geo-fencing with locational beacons, a Bluetooth device, a radio-frequency identification (RFID) device, and a mobile cellular network device;
   interrogating the web-based service for information pertaining to an organization located at the second detected location;
   receiving the information from the web-based service pertaining to the organization located at the second detected location; and
   modifying one or more graphical user interface elements of the location-aware application of the portable communication device using the information received from the web-based service such that a graphical user interface of the location-aware application displays an appearance showing affiliation with the organization at the second detected location.

17. A method for changing the appearance and/or functionality of a location-aware application on a portable communication device based on a detected location, the method comprising the steps of:
   detecting a location of the portable communications device by receiving a location signal from a location-defining device, the location-defining device comprising at least one of: a multiplicity of GPS satellites, a Wi-Fi local network, a near-field communication (NFC) device, an iBeacon, eco-fencing with locational beacons, a Bluetooth device, a radio-frequency identification (RFID) device, and a mobile cellular network device;
   interrogating a web-based service for information pertaining to an organization located at the detected location;

receiving the information from the web-based service pertaining to the organization located at the detected location; and modifying one or more graphical user interface elements of the location-aware application of the portable communication device using the information received from the web-based service such that a graphical user interface of the location-aware application displays an appearance showing affiliation with the organization at the detected location;

wherein modifying the one or more graphical user interface elements of the location-aware application does not include modifying an icon used to launch the location-aware application or any other application;

wherein the location-defining device comprises a radio-frequency identification (RFID) device; and wherein the scheduling options comprise class assignments for the detected location.

18. A portable communications device comprising:

a computer processor coupled to a bus;

a receiver coupled to the bus, the receiver adapted for receiving a location signal from a location-defining device;

a display screen coupled to the bus, the display screen adapted for displaying the information to the user of the portable communication device; and a non-transitory, computer-readable medium coupled to the bus, the computer-readable medium encoded with computer-executable instructions that, when executed by the computer processor, cause the device to perform the steps of:

detecting, by the computer processor, a location of the portable communications device by receiving a location signal, using the receiver, from a location-defining device, the location-defining device comprising at least one of: a multiplicity of GPS satellites, a Wi-Fi local network, a near-field communication (NFC) device, an iBeacon, geo-fencing with locational beacons, a Bluetooth device, a radio-frequency identification (RFID) device, and a mobile cellular network device;

interrogating, by the computer processor, a web-based service for information pertaining to an organization located at the detected location;

receiving, by the computer processor and the receiver, the information from the web-based service pertaining to the organization located at the detected location; and modifying, by the computer processor, one or more graphical user interface elements of the location-aware application of the portable communication device using the information received from the web-based service such that a graphical user interface of the location-aware application is displayed on the display screen with an appearance showing affiliation with the organization at the detected location;

wherein modifying the one or more graphical user interface elements of the location-aware application does not include modifying an icon used to launch the location-aware application or any other application; and wherein modifying one or more graphical user interface elements of the location-aware application includes changing characteristics of the screen display on the portable communication device so that the location-aware application shows location-specific branding information associated with the organization at the detected location, said location-specific branding information including one or more selections from a group consisting of: trademarks associated with the organization at the detected location, service marks associated with the organization at the detected location, logos associated with the organization at the detected location, slogans associated with the organization at the detected location, colors associated with the organization at the detected location, mascots associated with the organization at the detected location, banners associated with the organization at the detected location, crests associated with the organization at the detected location, seals associated with the organization at the detected location, and emblems associated with the organization at the detected location.

19. A non-transitory, computer-readable medium encoded with computer-executable instructions that, when executed by a computer processor of a portable communications device, cause the portable communications device to perform the method of claim 1.

* * * * *